(12) United States Patent　　　(10) Patent No.: US 12,625,241 B2

Vogel　　　　　　　　　　　　　　(45) Date of Patent: May 12, 2026

(54) METHOD AND SYSTEM FOR ALIGNING SURVEYING INSTRUMENTS

(71) Applicant: Trimble Inc., Westminster, CO (US)

(72) Inventor: Michael Vogel, Schleifreisen (DE)

(73) Assignee: Trimble Inc., Westminster, CO (US)

( * ) Notice: Subject to any disclaimer, the term of this patent is extended or adjusted under 35 U.S.C. 154(b) by 859 days.

(21) Appl. No.: 17/973,305

(22) Filed: Oct. 25, 2022

(65) Prior Publication Data

US 2023/0168354 A1　　Jun. 1, 2023

(30) Foreign Application Priority Data

Nov. 30, 2021　(EP) ..................................... 21211319

(51) Int. Cl.
*G01S 7/497* (2006.01)
*G01S 17/08* (2006.01)
*G01S 17/87* (2020.01)

(52) U.S. Cl.
CPC ............ *G01S 7/4972* (2013.01); *G01S 17/08* (2013.01); *G01S 17/87* (2013.01)

(58) Field of Classification Search
CPC ........ G01S 7/4972; G01S 17/08; G01S 17/87; G01C 15/002
See application file for complete search history.

(56) References Cited

U.S. PATENT DOCUMENTS

2006/0191148 A1 * 8/2006 Lippuner ............... G01C 25/00
　　　　　　　　　　　　　　　　　　　　　33/290
2009/0073061 A1 * 3/2009 Eriksson ............... G01R 29/105
　　　　　　　　　　　　　　　　　　　　　343/703

(Continued)

FOREIGN PATENT DOCUMENTS

CN　　105737848 A * 7/2016
CN　　105823420 A * 8/2016　........... G01B 11/002
　　　　　　　(Continued)

OTHER PUBLICATIONS

Machine translation of CN112747711A (Year: 2021).*

(Continued)

*Primary Examiner* — Yuqing Xiao

*Assistant Examiner* — Zhengqing Qi

(74) *Attorney, Agent, or Firm* — Kilpatrick Townsend & Stockton LLP

(57) ABSTRACT

A method for aligning two surveying instruments in a common space in a process that uses an autocollimation of a collimated light beam transmitted by a first surveying instrument and reflected by a second surveying instrument. In the alignment process, the first surveying instrument may emit a collimated light beam towards the second the surveying instrument and receive a reflection of the collimated light beam from the second surveying instrument in an autocollimator. The reflection may be generated for example by a mirror at the second surveying instrument. When the light beam is reflected such that autocollimation of the collimated light beam is achieved at the first surveying instrument, the first and second surveying instruments are in a predetermined positional relation with respect to one another. With a known predetermined positional relation between the reflecting mirror and the line of sight of the second surveying instrument, measurements by both surveying instruments can be made in a common coordinate system.

14 Claims, 6 Drawing Sheets

(56) References Cited

U.S. PATENT DOCUMENTS

| | | | | |
|---|---|---|---|---|
| 2013/0250284 | A1* | 9/2013 | Lienhart | G01B 11/272 356/138 |
| 2014/0300886 | A1 | 10/2014 | Zogg et al. | |
| 2019/0086206 | A1* | 3/2019 | Nishita | G01C 11/30 |

FOREIGN PATENT DOCUMENTS

| | | | | | |
|---|---|---|---|---|---|
| CN | 104697747 | B | * | 9/2017 | |
| CN | 109631828 | A | * | 4/2019 | G01C 1/02 |
| CN | 112747711 | A | * | 5/2021 | G01C 1/02 |
| JP | H10141946 | A | * | 5/1998 | |
| WO | 2021/069079 | A1 | | 4/2021 | |

OTHER PUBLICATIONS

Samuel Hetherington, Dean Osgood, Joe McMann, Viki Roberts, James Gill, and Kyle McLean "Optical alignment of the Global Precipitation Measurements (GPM) star trackers", Proc. SPIE 8844, Optical System Alignment, Tolerancing, and Verification VII, 884406 (Sep. 10, 2013). (Year: 2013).*
Jerrod Young, "Metrology-Based Techniques for Optical System Alignment for the OSIRIS-Rx Visual and InfraRed Spectrometer," Masters Thesis, University of Arizona, 2018. (Year: 2018).*
Machine translation of JP-H10141946-A (Year: 1998).*
Machine translation of CN105737848A (Year: 2016).*
Machine translation of CN104697747B (Year: 2017).*
Machine translation of CN109631828A (Year: 2019).*
Machine translation of CN105823420A (Year: 2016).*
Extended European Search Report for Application No. 21211319.5-1009, mailed May 31, 2022, 9 pages.
Aviado, C. et al., "Methods for Correlating Autocollimation of Theodolites and Coordinate Metrology in Spacecraft Systems," Optomechanical Technologies for Astronomy, Proceedings of SPIE, vol. 6273, 2006, 8 pages.

* cited by examiner

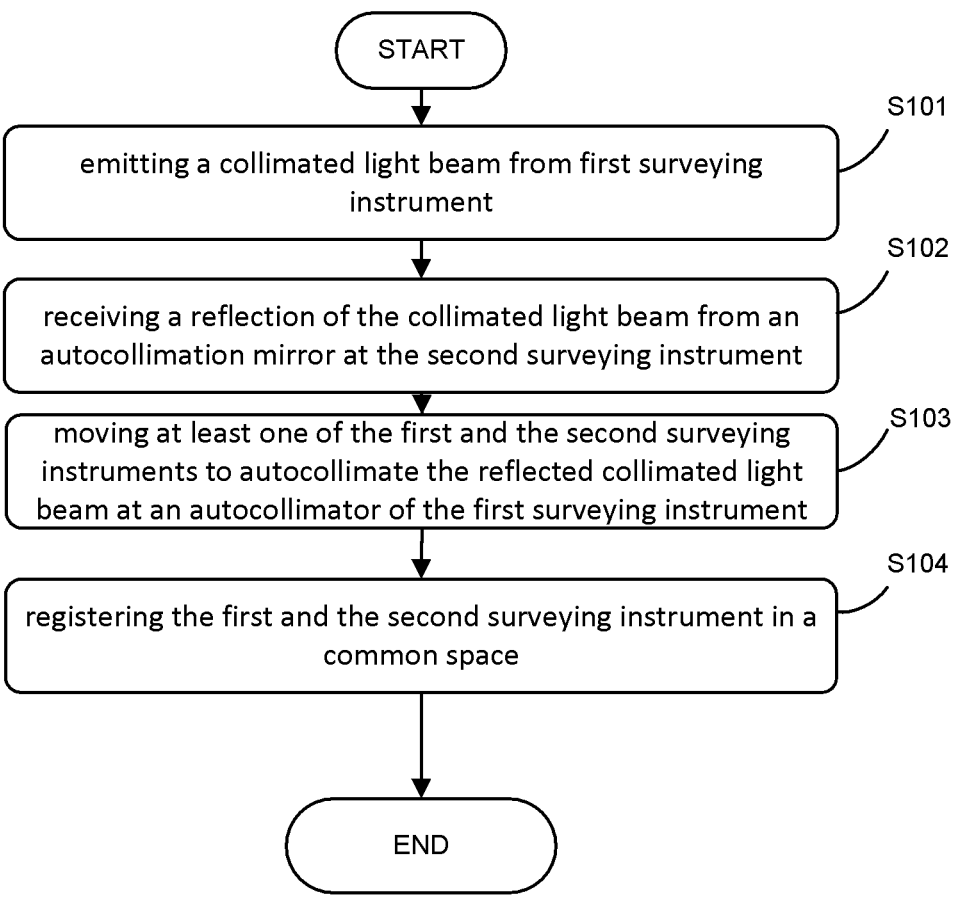

S101 emitting a collimated light beam from first surveying instrument

S102 receiving a reflection of the collimated light beam from an autocollimation mirror at the second surveying instrument

S103 moving at least one of the first and the second surveying instruments to autocollimate the reflected collimated light beam at an autocollimator of the first surveying instrument

S104 registering the first and the second surveying instrument in a common space

Fig. 1

METHOD AND SYSTEM FOR ALIGNING SURVEYING INSTRUMENTS

CROSS-REFERENCE TO RELATED APPLICATIONS

The present application claims priority to European Patent Application No. 21 211 319.5, filed Nov. 30, 2021, the entire contents of which are incorporated herein by reference for all purposes.

FIELD

The present invention relates to surveying instruments, e.g. to survey geologically. More precisely, the present invention relates to a method and system for aligning surveying instruments.

TECHNOLOGICAL BACKGROUND

Surveying instruments like total stations or tachymeter generally such as for geological survey can measure angles and distances, such as to or between targets and may be used to determine positions of targets as for example in the field or on a construction site. A target may be a reflector at a stationary or moving object or any other element. The positions of the targets may be determined in three dimensions in a coordinate system spanned by the surveying instrument or any other coordinate system. Generally, surveying instruments are equipped with a telescope that may be aimed at a target. After aiming at the target horizontal and vertical angles of the telescope may be read out. Combined with a distance measurement a position of the target in the coordinate system can be found. The measurement of angles may be performed in the two face orientations of the telescope, as known in the art, allowing to eliminate errors.

Surveying instruments may also be used to search a target and/or to track a movement of the target. For this purpose, the target may be equipped with a reflecting element and the search process may be performed by emitting a search beam from the surveying instrument used for the search and/or tracking. The surveying instrument may be moved until a reflection from the target or a reflecting element at the target is received. After locking onto the target or reflecting element, the motion of the target may be tracked, such as a moving vehicle on a construction site.

The searching, tracking and positioning of targets in three-dimensional space can be performed by a single surveying instrument. However, on a larger site multiple surveying instruments may be needed for extended coverage.

If multiple surveying instruments are used together for measurements, the positioning operations may advantageously be performed in the same coordinate system. For this purpose the multiple surveying instruments need to be registered in the same coordinate system. This, however, may be a time-consuming and error prone process during which operators of the first and second surveying instrument need to determine a position and orientation of the surveying instruments in a common three-dimensional space.

For example, if multiple surveying instruments are used, a position of the surveying instruments and an orientation of the lines of the sight of the respective telescopes may be determined. Subsequently, when measurements are performed with the surveying instruments, angles and positions obtained by the measurements may be transformed into a common space or coordinate system by a conversion calculation. The conversion calculation allows to align or register the surveying instruments in a common coordinate system, subsequent to which the surveying instruments may be used to determine orientations, distances and positions in the common coordinate system.

The process of aligning the two surveying instruments in the same coordinate system, however, is time-consuming and requires careful measurements at the involved surveying instruments. The process of alignment furthermore inherently lacks precision in the determination of the position and orientation of the surveying instruments relative to one another and in turn, the common coordinate system cannot be defined with high precision. Consequently, the precision generally available for measurements made by a single surveying instrument is no longer available for measurements performed in a common coordinate system.

SUMMARY

It is therefore an object of the invention to provide an improved method and system for precisely aligning surveying instruments in a common space.

This object of the invention is solved by the subject matter of the independent claims. Advantageous embodiments are disclosed in the dependent claims.

The invention allows to align multiple surveying instruments in a common space at high precision. An autocollimation process can be employed at a first surveying instrument based on a collimated light beam reflected by a second surveying instrument.

BRIEF DESCRIPTION OF THE DRAWINGS

FIG. 1 illustrates operations of a method for aligning surveying instruments according to an embodiment of the invention based on an autocollimation process.

DESCRIPTION

Figure 2:
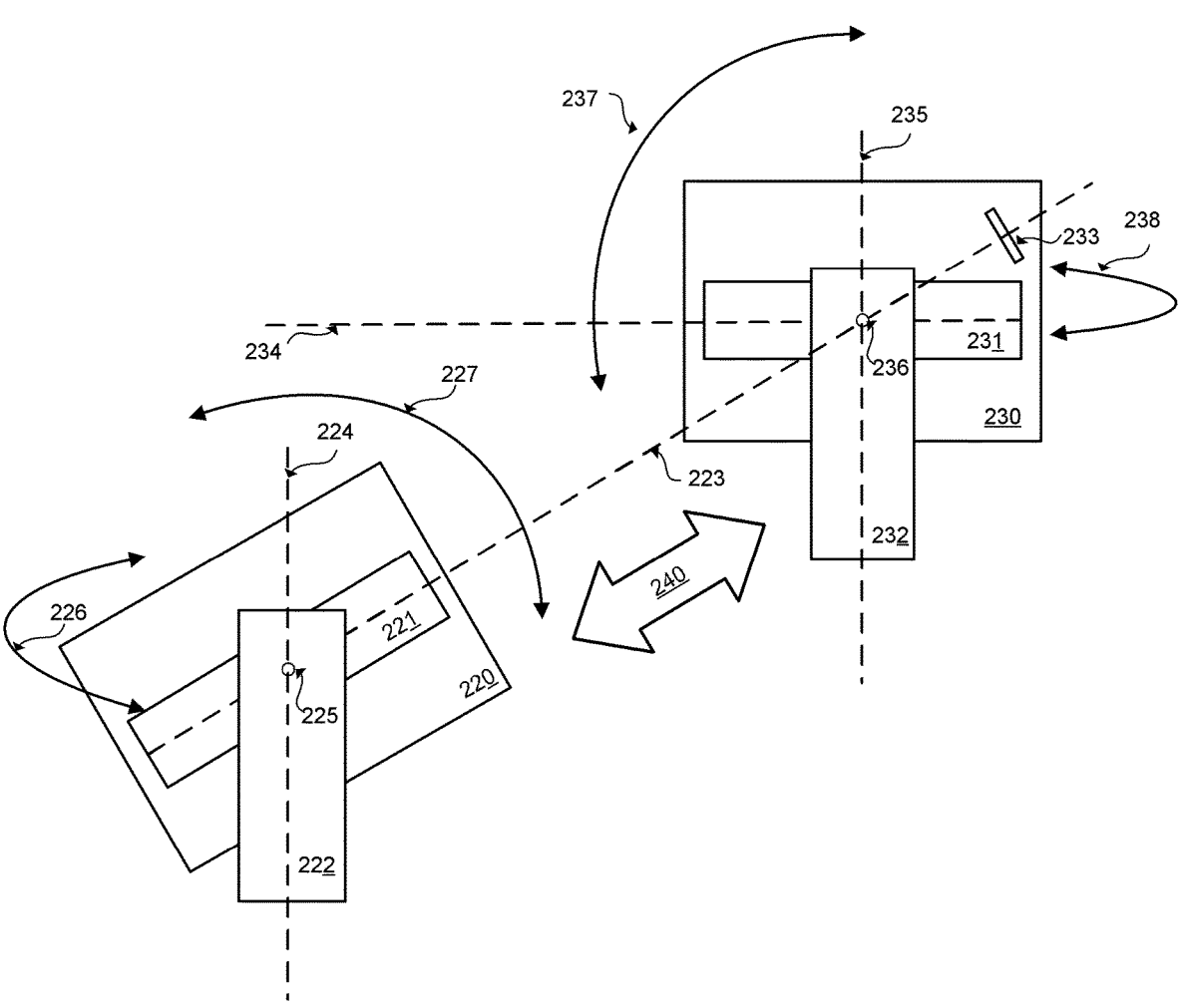
FIG. 2 illustrates a system for aligning surveying instruments based on an autocollimation process according to an embodiment of the invention.

FIG. 1 illustrates operations of a method for aligning two surveying instruments according to the embodiment of the invention.

The surveying instruments can be aligned in a common space in a process that uses an autocollimation of a collimated light beam transmitted by a first surveying instrument and reflected by a second surveying instrument.

In the alignment process, the first surveying instrument may emit a collimated light beam towards the second the surveying instrument and receive a reflection of the collimated light beam from the second surveying instrument in an autocollimator of the first surveying instrument. The reflection may be generated for example by a mirror at the second surveying instrument. When the light beam is reflected such that autocollimation of the collimated light beam is achieved at the first surveying instrument, the first and second surveying instruments are in a predetermined positional relation with respect to one another. With a known predetermined positional relation between the reflecting mirror and the line of sight of the second surveying instrument, measurements by both surveying instruments can be made in a common coordinate system.

More precisely, as illustrated by operation S101, a collimated light beam is emitted from the first surveying instrument towards the second surveying instrument, the collimated light beam being aligned with a line of sight of the first surveying instrument. For example, the light beam may be infrared light beam that is emitted through or in parallel to the line of sight of an optical telescope of the first surveying instrument.

The line of sight may be defined by an arrangement of optical lenses of the telescope and a cross hair of an eyepiece or a defined position on a light sensing element.

In an operation S102, a reflection of the collimated light beam from an autocollimation mirror at the second surveying instrument is received at the first surveying instrument, the normal of the autocollimation mirror being arranged with a predetermined relationship with respect to the line of sight of the second surveying instrument. According to an embodiment an error or a deviation over time of the predetermined relationship may be determined by a measurement of the autocollimation mirror in the two faces of the second surveying instrument by use of the first surveying instrument. For example, in the first face orientation of the second surveying instrument two measurements of the autocollimation mirror are made using the first surveying instrument, with one measurement in each of the two face orientations of the first surveying instrument. Then, in the second face orientation of the second surveying instrument two measurements are made using the first surveying instrument, with one measurement in each of the two face orientations of the first surveying instrument. The measurements may be performed in time intervals or during the process of aligning the surveying instruments in a common space.

In an operation S103 at least one of the first and second surveying instruments is moved so that the reflected collimated light beam is autocollimated at an autocollimator provided at the first surveying instrument. The moving may include a suitable rotation of at least one of the first and second surveying instruments such that the autocollimation mirror reflects the light beam in a way that leads to an autocollimation of the light beam at the autocollimator of the first surveying instrument. The rotating may include a rotation of the surveying instrument around at least one of a horizontal and vertical axis.

In an operation S104 the first and the second surveying instruments can be registered in a common space based on an orientation of the line of sight of the first surveying instrument and the predetermined relationship between the normal of the autocollimation mirror and the line of sight of the second surveying instrument when the collimated light beam is autocollimated at the first surveying instrument. The registering in the common space may also include the positions of the surveying instruments, either absolute or relative to one another. This may include determining a distance from the first surveying instrument to the second surveying instrument, preferably between the respective centers of the surveying instruments. For example, a distance from the first surveying instrument to the autocollimation mirror of the second surveying instrument may be measured using distance measurement equipment and a known offset between the mirror and the center of the second surveying instrument may be accounted for. Therein the center of the surveying instrument may be defined as the intersection of the rotational axes of the telescope of the surveying instrument. The registering in the common space may include obtaining a vertical angle and a horizontal angle of the telescope and thus line of sight of the first surveying instrument and obtaining based thereon the angular offsets of the telescope and thus line of sight of the second surveying instrument relative to a coordinate system spanned by the first surveying instrument. The angular offsets can be calculated based on the predetermined relationship between the normal of the autocollimation mirror and be line of sight of the second surveying instrument. It is understood that based on the state of autocollimation of the collimated light beam angular measurements by the surveying instruments may be transposed into any coordinate system.

Registering the first and second surveying instruments in a common space may generally include accounting for six degrees of freedom, including three rotational degrees of freedom and three positional degrees of freedom of the second surveying instrument. The three positional degrees of freedom may be accounted for by the position measurement performed by the first surveying instrument, for example using distance and angular measurements, and/or measurements using a global positioning system. Moreover, two rotational degrees of freedom may be accounted for by making use of the predetermined positional relation between the autocollimation mirror the line of site of the second surveying instrument. The third rotational degree of freedom can additionally be accounted for by using a tilt sensor at the second surveying instrument, used to adjust the vertical axis of the second surveying instrument in a truly vertical direction.

A tilt sensor at the first surveying instrument and a determination of the position of the first surveying instrument for example using a global positioning system can furthermore be employed for alignment with a global coordinate system.

Accordingly, the positional and angular measurements made by the second surveying instrument can be directly used in the coordinate system of the first surveying instrument or any other coordinate system by way of coordinate transformation calculations.

By the method illustrated in FIG. 1 at least two surveying instruments may be aligned in a common space at high precision by employing an autocollimation of a light beam at the first surveying instrument based on a reflection of the collimated light beam at the second surveying instrument.

Subsequently, an embodiment of a system for aligning surveying instruments will be illustrated with respect to FIG. 2.

FIG. 2 illustrates a first surveying instrument 220 and a second surveying instrument 230. The surveying instruments may be total stations or tachymeter. The embodiment of FIG. 2 illustrates how the first and second surveying instruments can be aligned with one another so as to perform measurements in a common space using an autocollimation of a collimated beam emitted by the first surveying instrument and reflected by the second surveying instrument.

In the embodiment the first surveying instrument 220 is provided with a telescope 221 having a line of sight 223. The first surveying instrument is rotatably held by a base or alidade 222. The surveying instrument 220 may be rotated around the horizontal or trunnion axis 225 and may be rotated around a vertical axis 224.

Similarly, the second surveying instrument 230 is provided with a telescope 231 having a line of sight 234 and is rotatably held by a base 232. An autocollimation mirror 233 is provided in the second surveying instrument 230. In an alternative the autocollimation mirror 233 may be attached at a housing of the second surveying instrument. The normal of the autocollimation mirror 233 has a predetermined relationship with the line of sight of the second surveying instrument. In other words, the orientation and/or position of the autocollimation mirror 233 in relation to the telescope 231 and the corresponding line of sight 234 is predetermined and known.

In order to align the surveying instruments 220 and 230, the first surveying instrument 220 emits a collimated light beam towards the second surveying instrument 230. In the embodiment, the collimated light beam is aligned with the line of sight 223 of the first surveying instrument 220. According to an example, the collimated light beam is emitted in a direction coinciding with the line of sight 223 of the first surveying instrument 220. In an alternative, the collimated light beam may be travelling in parallel to the line of sight 223. The collimated light beam impinges on the autocollimation mirror 233 and is at least partly reflected. The first surveying instrument 220 receives at least part of the reflection of the collimated light beam from the auto-collimation mirror 233. By rotating at least one of the first and second surveying instruments the received reflection can be maximised to align the line of sight of the first surveying instrument and the normal of the autocollimation mirror 233 of the second surveying instrument.

In order to achieve an autocollimation of the collimated light beam with its reflection from the second surveying instrument, at least one of the first and second surveying instruments 220 and 230 are moved. This movement may involve a rotation of at least one of the first and second surveying instruments. In an example the first surveying instrument 220 may be rotated around the horizontal axis 225, as indicated by the arrow 227. Alternatively, or in addition thereto, the first of surveying instrument may be rotated around the vertical axis 224, as indicated by the arrow 226. The rotation of the first surveying instrument is performed to direct the collimated light beam towards the autocollimation mirror 233 of the second surveying instrument 230.

Moreover, the second surveying instrument 230 may be rotated around the horizontal axis 236, as indicated by arrow 237. Alternatively, or in addition thereto, the second surveying instrument may be rotated around the vertical axis 235, as indicated by the arrow 238. The rotation of the second surveying instrument 230 is performed so as to direct the reflected collimated light beam back to the first surveying instrument.

The first and second surveying instruments may be rotated around the respective horizontal and vertical axes until the reflected collimated light beam is autocollimated at an autocollimator of the first surveying instrument. The autocollimator of the first surveying instrument may be a dedicated unit of the first surveying instrument, such as an autocollimator solely for the purpose of receiving the reflected collimated light beam, or may be an existing unit of the first surveying instrument, such as of a tracking system of the first surveying instrument.

As a result, the normal of the autocollimation mirror 233 of the second surveying instrument 230 is precisely aligned with the emitted collimated light beam from the first surveying instrument 220 along the line of sight 230 of the first surveying instrument 220.

As the autocollimation mirror 233 has a predetermined positional and/or angular relationship with the telescope 231 of the second surveying instrument and consequently with the line of sight 234 of the telescope, and if the collimated light beam is autocollimated at the first surveying instrument 220 after being reflected from the autocollimation mirror 233 of the second surveying instrument 230, the directional relationship between the line of sight 234 of the second surveying instrument 230 and the line of sight 223 of the first surveying instrument 220 is defined. The first and the second surveying instruments can now be registered in a common space, based on the known orientation of the emitted collimated light beam aligned with the line of sight of the first surveying instrument 220 and the predetermined relationship between the normal of the autocollimation mirror 233 and the line of sight 234 of the second surveying instrument of 230. The registering of the first and second surveying instruments in a common space may also include translating the coordinate system spanned by one of the surveying instruments into the coordinate system of the other of the surveying instruments or into any other coordinate system. Methods for coordinate transformation from one coordinate system into another coordinate system is well-known in the art and may be used at need.

Registering the surveying instruments in a common space or coordinate system may also include determining a position of at least one of the first and second surveying instruments so as to transform the coordinate systems. With the above it becomes possible to transform the coordinate system of the second surveying instrument into the coordinate system of the first surveying instrument or to transform the coordinate systems of the first and second surveying instruments into any other coordinate system. A position of a surveying instrument may for example be determined by GPS or a comparable technology, or may be determined relative to a known position as known in the art.

The operations to align the surveying instruments may include emitting adjustment instructions for moving at least one of the first surveying instrument and the second surveying instrument, wherein the moving includes rotating the at least one of the first and second surveying instruments around at least one of its vertical and horizontal axes.

The process of rotating the first and second surveying instruments to achieve an autocollimation of the collimated light beam and its reflection may be controlled by a control unit.

The control unit may perform a process of rotating the surveying instruments in an alignment process. For example, in a first step the telescope 221 with the line of sight 223 of the first surveying instrument 220 is rotated towards the second surveying instrument, for example by searching a prism or reflector at the second surveying instrument using a search beam. The rotating of the first surveying instrument may be performed in a search and track mode of the first surveying instrument for searching and tracking the second surveying instrument. Moreover, the first surveying instrument may be rotated to direct the collimated light beam towards the autocollimation mirror of the second surveying instrument.

Subsequently, the second surveying instrument is rotated controlled by the control unit such that the reflected collimated light beam reaches the autocollimator at the first surveying instrument for autocollimation thereat. If necessary, the steps of rotating the first and second surveying instruments may be repeated so as to direct the collimated light beam precisely to the reflection mirror at the second surveying instrument and to direct the reflected collimated light beam precisely into the autocollimator of the first surveying instrument so that the autocollimation of the light beam is achieved.

A control unit may be provided at the first or second surveying instrument and/or external thereto. It is also conceivable to provide the control unit partially at the first and second surveying instruments and partially external thereto. The control unit preferably provides functionality to drive motors at the first and second surveying instrument, to rotate the instruments, to determine whether the first surveying instrument emitting the collimated light beam properly aims at the autocollimation mirror of the second surveying instrument and to determine whether the light beam is autocollimated at the first surveying instrument.

Using the autocollimation of the light beam allows a highly precise alignment of the first and second surveying instruments and thus a superior precision of measurements performed by the first and second surveying instruments in a common space.

Even though the embodiment shown in FIG. 2 illustrates two surveying instruments, it is understood that further surveying instruments are aligned in a common space with the first and second surveying instruments using the same procedure. For example, the first surveying instrument may be employed in the alignment process of a third surveying instrument, or the second surveying instrument may be employed in this process.

Figure 3:
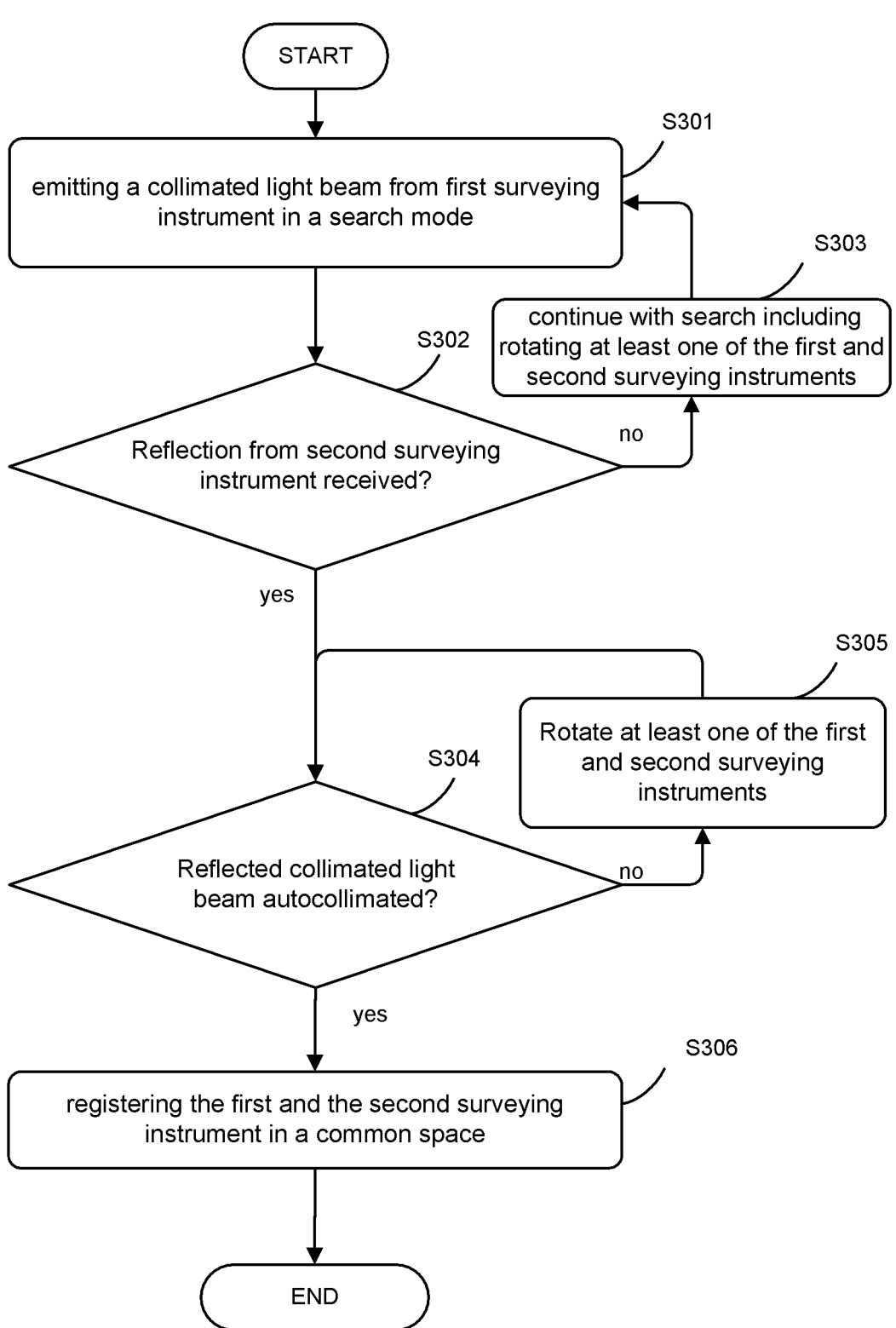
FIG. 3 illustrates operations for aligning surveying instruments according to another embodiment of the invention, particularly illustrating operations for orientating the surveying instruments in the autocollimation process.

Subsequently, a further embodiment of the invention is described with respect to FIG. 3. FIG. 3 illustrates a flowchart for aligning the first and second surveying instruments in a common space.

The operations of FIG. 3 may be carried out by the first and second surveying instruments as shown in FIG. 2, however, FIG. 3 is not limited thereto.

In a first operation S301 the first surveying instrument emits a collimated light beam in a search mode. For example, the search mode may be a mode in which the first surveying instrument emits a search beam while being rotated around at least one of the horizontal and vertical axis, searching for a target, in the present case the second surveying instrument. For example, the second surveying instrument is equipped with at least one reflecting element or is equipped with a housing that has reflecting properties so that the first surveying instrument receives a reflection if the search beam impinges on the second surveying instrument. In one embodiment the search beam is constituted by the collimated light beam emitted by the first surveying instrument, however, any other search beam may be employed. In an operation S302 it is determined at the first surveying instrument whether a reflection of the emitted search beam is received at the first surveying instrument from an autocollimation mirror at the second surveying instrument, such as the autocollimation mirror 233 of FIG. 2. A suitable light sensing element may be used to detect whether a reflection of the search beam is received. The light sensing element may be a CCD sensor or any other suitable light sensing element. Generally, a reflection is received if the normal of the autocollimation mirror is aligned with the line of sight of the first surveying instrument, presuming that the search beam is emitted from the first surveying instrument in alignment with the line of sight of the first surveying instrument. The normal of the autocollimation mirror is a line perpendicular to the surface of the mirror.

If the decision is "no", thus a reflection is not received, in an operation S303, the first surveying instrument continues with the search by continuing to emit the search beam while rotating around the horizontal and/or vertical axis until the search beam is directed at the second surveying instrument. In addition or alternatively thereto the second surveying instrument may be rotated around the horizontal and/or vertical axis. If the decision is "yes", thus a reflection is received from the second surveying instrument, in an operation S304 it is determined whether the received reflection of the collimated light beam is autocollimated at the autocollimator at the first surveying instrument. If the autocollimation mirror at the second surveying instrument is suitably oriented towards the first surveying instrument, the reflection can be received by the detector such as an autocollimator at the first surveying instrument and autocollimation is achieved, when the collimated light beam and its reflection coincide in the autocollimator, for example on a light sensing element of the autocollimator. If in operation S304 it is determined that the collimated light beam is not autocollimated, in an operation S305 at least one of the first and second surveying instruments is rotated around the horizontal and/or vertical axes and operation S304 is repeated, until autocollimation is achieved. If in operation S304 the reflected collimated light beam is determined to be autocollimated, the autocollimation mirror is precisely positioned with respect to the first surveying instrument, with the normal of the autocollimation mirror coinciding with the line of sight of the first surveying instrument, as for example illustrated in FIG. 2.

Subsequently in an operation S306 the first and second surveying instruments can now be registered in a common space, as outlined before, using the known positional and orientational relations between the autocollimation mirror and the line of sight of the second surveying instrument and the orientation of the line of sight of the first surveying instrument and corresponding angles measured at the surveying instruments in the state of achieved autocollimation of the collimated light beam. The process may include determining a distance between the centers of the surveying instruments.

The embodiment of FIG. 3 allows to align two surveying instruments in a common space with high precision, by employing the autocollimation of a collimated light beam emitted from the first surveying instrument, reflected by a mirror in a predetermined position and orientation at the second surveying instrument. If the reflected light beam is autocollimated at the first surveying instrument, the precise orientation of the mirror is known relative to the first surveying instrument. And, with the known positional relation of the mirror and the telescope of the second surveying instrument, measurements by the first surveying instrument and the second surveying instrument can be performed in the same space or coordinate system.

Figure 4:
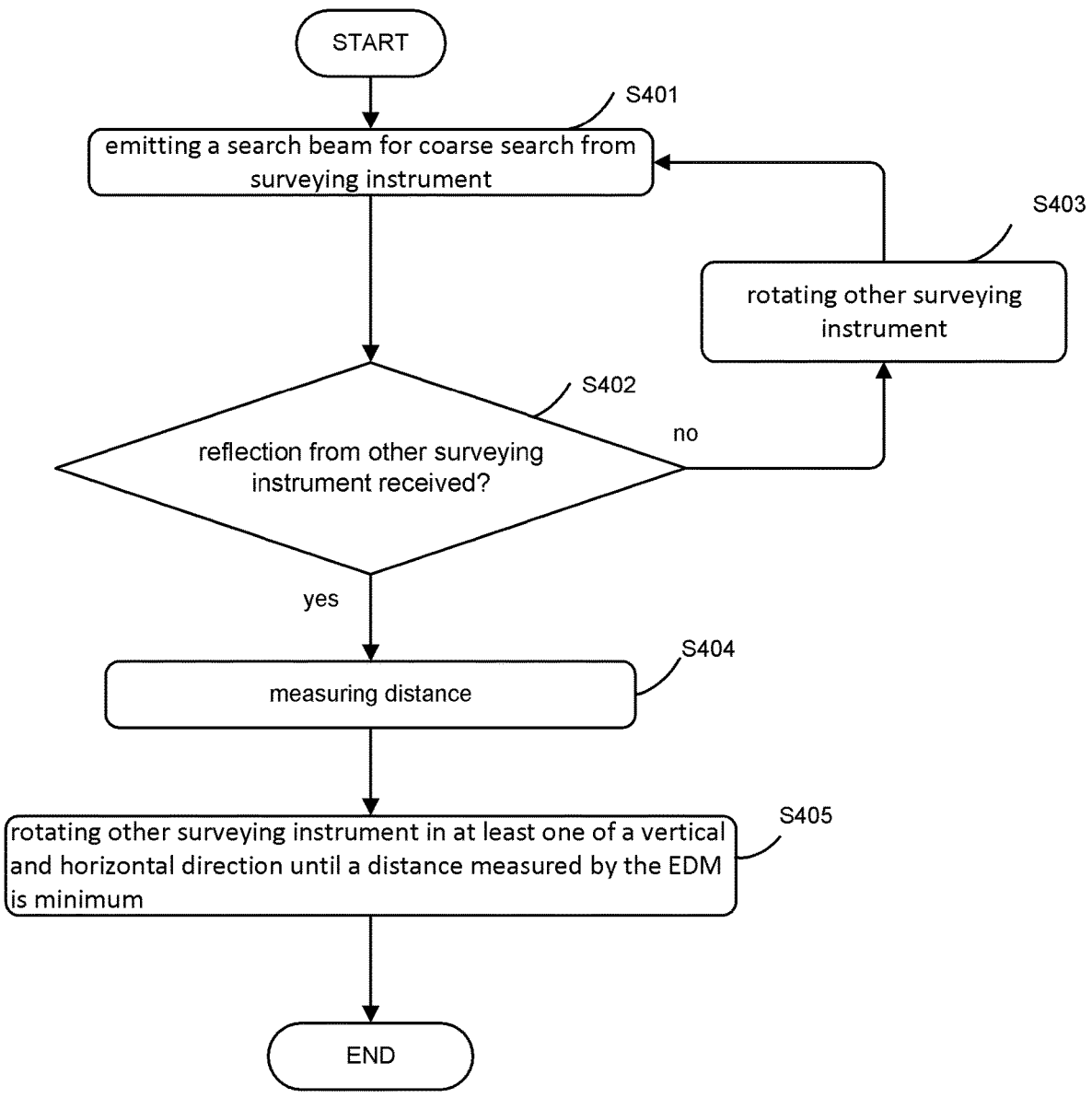
FIG. 4 illustrates operations of a method for coarsely aligning surveying instruments according to an embodiment of the invention.

Subsequently, a further embodiment of the invention is described with respect to FIG. 4. FIG. 4 illustrates another embodiment of operations of a method for aligning two surveying instruments for performing measurement in the same coordinate system. More precisely, FIG. 4 illustrates operations for coarsely aligning the first and second surveying instrument, such as the surveying instruments shown in FIG. 2, before the surveying instruments are finely aligned using the autocollimation process described earlier.

While the autocollimation process is highly accurate, it may prove to be time consuming to arrange the first and second surveying instruments by the methods of the preceding embodiments in a way that the reflection of the collimated light beam reaches the autocollimator at the first surveying instrument. Only in a narrow range of angles of orientation the emitted collimated light beam will be reflected back into the autocollimator. It may therefore be necessary to perform very fine adjustments of the surveying instruments in the search process described earlier to make the reflection reach the autocollimator of the first surveying instrument.

Accordingly, according to advantageous features it is possible to first coarsely align the surveying instruments with respect to one another so that the reflection is generally detectable in the autocollimator. The coarse alignment can be performed prior to starting the fine alignment based on the processes described with respect to the previous embodiments to precisely steer the reflection of the collimated light beam in the autocollimator to achieve autocollimation.

The procedure may include performing the coarse alignment of at least one of the first and second surveying instrument by emitting a search beam for coarse search from one of the first and second surveying instruments and detecting whether a reflection from one of a plurality of reflecting elements arranged with a predetermined relationships with respect to the line of sight of the other of the first and second surveying instruments is received. If a reflection is not received, at least one of the first and second surveying instruments can be rotated and the detection operation repeated.

Moreover, the procedure may include emitting an EDM laser beam from the one of the first and second surveying instruments, and if a reflection is received from a reflecting element arranged in a predetermined relationship with respect to the line of sight of the other of the first and second surveying instruments, measuring a distance to the reflecting element, rotating the other surveying instrument in at least one of a vertical and horizontal direction until a distance measured by the EDM is minimum.

More precisely, according to the embodiment of FIG. 4, in a first operation S401 a search beam for the coarse search is emitted from one of the surveying instruments. The search beam for coarse search may be emitted from the first surveying instrument or the second surveying instrument. The search beam for coarse search could for example be infrared light emitted by one of the surveying instruments towards a region of interest, such as a construction site. A reflection of the emitted search beam is detected from the other of the surveying instruments positioned in the region of interest. As an example, the search beam may be reflected by a reflecting element at the other of the surveying instruments, for example a reflecting foil, a reflector, or a prism or a combination thereof. The reflecting element preferably is attached at a predetermined position at the surveying instrument with a predetermined positional relation in respect of the telescope defining the line of sight of the second surveying instrument.

In an operation S402 it is determined at the surveying instrument emitting the search beam, whether a reflection from the other one of the surveying instruments is received. Generally, a reflection of the search beam can be received if the search beam illuminates the reflecting element at the other surveying instrument so that the reflected beam reaches a detector at the emitting surveying instrument. If an operation S402 the decision is "no", thus a reflection is not received, in an operation S403 the other surveying instrument is rotated around at least one of its vertical and horizontal axis and operations S401 and S402 are repeated. This procedure is repeated until the decision in step S402 is that a reflection is received.

If an operation S402 the decision is "yes", thus a reflection is received from the other surveying instrument, in an operation S404 a distance between the surveying instrument emitting the search beam and the reflector at the other surveying instrument is measured. The measurement of the distance can be performed by an electronic distance measurement device available at the surveying instrument.

Subsequently, in an operation S405 the other surveying instrument is rotated in at least one of a vertical and horizontal direction until a distance measured by the electronic distance measurement is minimised. The reflecting element is provided at the surveying instrument with an offset relative to the axes of rotation and therefore minimising the distance to the reflecting element assures that the reflecting element faces the surveying instrument emitting the search beam at a position that is the closest possible to the emitting surveying instrument. As noted, the reflecting element will not be positioned at the intersection of the horizontal and vertical axis of the surveying instrument, but with an offset thereof. Accordingly, once the distance to the reflecting element towards the emitting surveying element is minimised, and with the position of the reflecting element being predetermined with respect to the viewing axis of the surveying instrument, an orientation of the viewing axis of the surveying instrument emitting the search beam and the other surveying instrument is defined and the coarse alignment of the surveying instruments is completed.

Based on the coarse alignment of the surveying instruments and with the known positional relation between the normal of the reflecting mirror at the second surveying instrument, the second surveying instrument can now be rotated into a position in which the collimated light beam is received by the autocollimator of the first surveying instrument.

In the embodiment of FIG. 4, the reflecting element may be attached to either one of the first and second surveying instruments and the search beam may be emitted by the other of the surveying instruments.

The embodiment of FIG. 4 facilitates a coarse alignment of the surveying instruments before the fine alignment using the autocollimation process is started. Namely, even though the autocollimation process allows for a highly accurate alignment of the surveying instruments, the angular range in which the reflected collimated light beam can be received by the autocollimator of the first surveying instrument is small. Accordingly, the coarse alignment can position the surveying instruments with respect to one another such that the reflected collimated light beam reaches the autocollimator at the first surveying instrument so that the process of alignment can be sped up.

Subsequently, a further embodiment of the invention is described with respect to FIG. 5.

Figure 5:
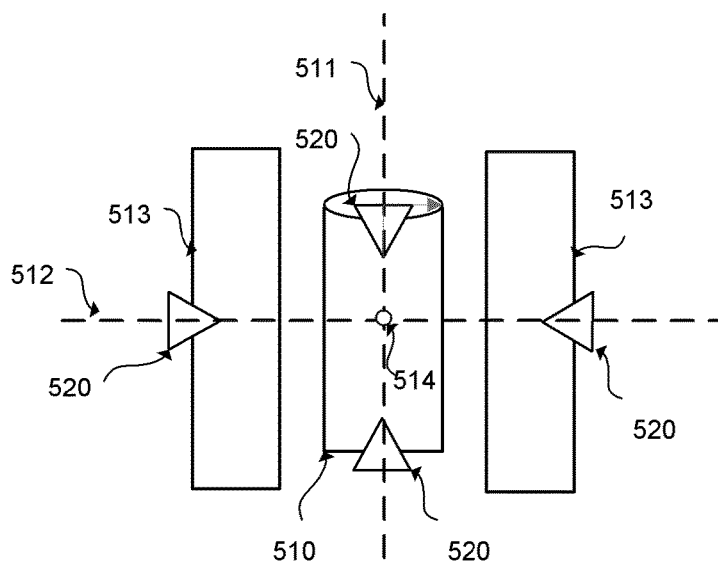
FIG. 5 schematically illustrates a top view of a surveying instrument according to an embodiment of the invention, particularly illustrating reflecting elements applied to the surveying instrument.

FIG. 5 schematically illustrates a top view of a surveying instrument used in the coarse alignment process, such as the surveying instruments of the preceding embodiments. As noted, the detected surveying instrument may be either one of the first or second surveying instruments described with respect of the previous embodiments. FIG. 5 shows a plurality of reflection elements arranged in a circumferential direction of the surveying instrument such that for each orientation of the surveying instrument one or at least one of the reflecting elements reflects the search beam.

In the embodiment, two reflecting elements are arranged at the horizontal axis on either side of the base and wherein two reflecting elements are arranged on either end of the telescope with a first and a second vertical angular offset from the line of sight of the surveying instrument.

More precisely, FIG. 5 illustrates a surveying instrument with a telescope 510 having a line of sight 511. The telescope 510 is held by a base 513 rotatably around a horizontal axis 512. The base and the telescope are rotatable around a vertical axis 514. In the embodiment shown in FIG. 5 the surveying instrument is equipped with four prisms 520. Two of the prisms 520 are attached to the base 513 at a position coinciding with the horizontal act 512. The further two prisms 520 are attached to the telescope 510. The prisms at the telescope are arranged in alignment with the line of sight 511.

For example, one of the prisms at the telescope is attached with a positive vertical angular offset, while the other of the prisms at the telescope is attached with a negative vertical angular offset. More precisely, one of the prisms may be arranged at the upper part of the front end of the telescope, while the other prism is arranged below an eyepiece of the telescope or below a light sensing element of the telescope, or vice versa. Each of the prisms 520 covers a section of the horizontal plane in the coordinate system of the surveying instrument, for example+/−45°. Each of the prisms 520 is in a predetermined positional relation with the line of sight 511 of the telescope 510 so that together with knowledge of the orientation of the prism the orientation of the line of sight can be determined. Accordingly, it is necessary to determine which prism reflects the search beam and the orientation of the prism needs to be determined.

A search beam arriving at the surveying instrument will be reflected by one of the prisms 520. The surveying instrument emitting the search beam therefore receives a reflection from one of the prisms, but it is not yet known from which one. In order to determine which of the prisms reflects the search beam, the surveying instrument can be instructed to perform rotational steps around the vertical and horizontal axes. In a first step to determine which prism effects the reflection, a distance to the reflecting prism can be minimised using a distance measurement equipment of the surveying instrument emitting the search beam. The surveying instrument carrying the prisms can be instructed to perform rotations until the distance to the reflecting prism is minimum. If now a rotation of the surveying instrument around the horizontal axis is performed, the position of the reflecting prism will not change, if the prism is located on the horizontal axis 512. On the other hand, the position of the reflecting prism will change relative to the surveying instrument emitting the search beam, if the prism is located on the telescope 510, offset from the horizontal axis. In a further step of distinguishing the prisms on the telescope from one another, it can be determined whether upon a rotation around the vertical axis 512, starting from a horizontal direction of the line of sight towards zenith, the reflecting prism moves upward at gradually increased distance to the surveying instrument emitting the search beam, or moves upward at reduced distance. It is thus known whether the vertical angular offset of the prism is upward or downward in relation to the line of sight of the telescope 510.

If the search beam arrives at one of the prisms fixed to the base on or close to the horizontal axis, a rotation of the surveying instrument around the horizontal axis will not lead to a change of the position of the reflecting element, as it is merely rotated around itself. Accordingly, it is known in this case that the reflecting element is provided at the rotational axis and the surveying instrument may be rotated by 90° around its horizontal axis so that instead of the reflecting element on the horizontal axis one of the reflecting elements with the offset fixed to the telescope 600 of the surveying instrument generates the reflection.

A combination of the movements and determination steps can be used to identify the reflecting prism and based on the predetermined positional relation of the determined prism in relation to the line of sight 511 can then be used to coarsely align the surveying instruments in a common coordinate system, as explained before. Following the coarse alignment of the surveying instruments the known positional relations between the prisms, the autocollimation mirror and the line of sight of the surveying instrument, the second surveying instrument can be rotated into a position in which the normal of the autocollimation mirror is coarsely aligned with the line of sight of the first surveying instrument. In this positional relation the autocollimation process of the collimated light beam emitted by the first surveying instrument can be performed as outlined before, so that the surveying instruments can be finely aligned in a common coordinate system.

Advantageously, the central axis of each prism such as constituted by the symmetry axis intersects with the intersection of the vertical axis 514 and the horizontal axis 512. Such geometry of the surveying instrument facilitates the alignment process by eliminating calculations to compensate for a parallel misalignment of axes and/or lines of sight.

As an alternative, instead of prisms 520, reflecting foils or cat eyes can be used. In these cases the normal of a reflecting foil or mirror intersects with the intersection of the vertical axis 514 and the horizontal axis 512.

With the arrangement of prisms at the surveying instrument as shown in FIG. 5 a coarse adjustment of the orientation of the surveying instrument becomes possible subsequent to which a fine alignment using the autocollimation process is performed.

Figure 6:
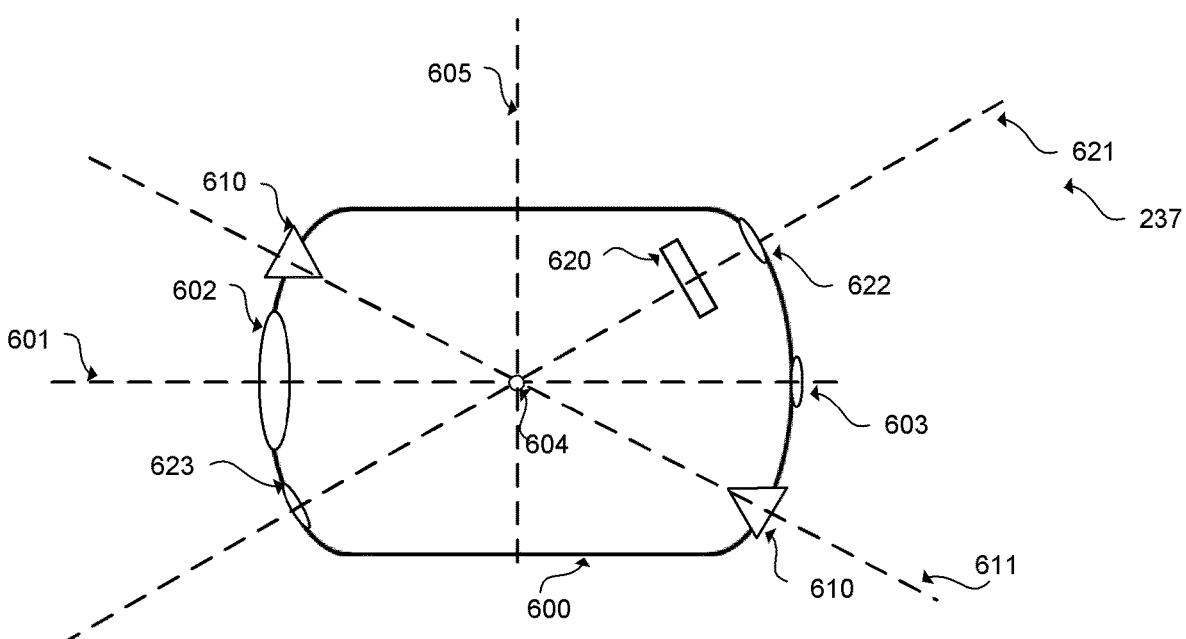
FIG. 6 schematically illustrates a side view of a surveying instrument according to an embodiment of the invention, particularly illustrating reflecting elements applied to the surveying instrument.

Subsequently a further embodiment of the invention is described with respect to FIG. 6. FIG. 6 schematically illustrates a side view of a telescope 600 of a surveying instrument.

The telescope 600 has a line of sight 601, for example defined by a length 602 and an eyepiece or image sensing device 603. The telescope can be rotated around a horizontal axis 604 and a vertical axis 605. Advantageously, in order to reduce computational requirements when Performing measurements using the telescope, the line of sight 601, the horizontal axis 604 and the vertical axis 605 intersect at one point.

Moreover, the telescope is equipped with prisms 610 having an axis of symmetry intersecting with the point of intersection of the horizontal and vertical axis of the surveying instrument. And an autocollimation mirror 620 that can be viewed from the outside through windows 622 and 623 in the housing of the telescope. Alternatively, instead of the autocollimation mirror 620 the windows 622 and 623 may be constituted by mirrors. The normal direction of the autocollimation mirror 620 or the mirrors constituting the windows 622 and 623 intersect with the point of intersection of the horizontal and vertical axis and the line of sight. The intersection may be considered to constitute the center of the surveying instrument.

If for registering the surveying instruments in a common space, as outlined before, a distance from the first surveying instrument to the autocollimation mirror is determined using distance measurement equipment, the offset between the mirror and the center of the second surveying instrument advantageously is accounted for. The offset may be known and correspondingly added or subtracted from a distance measurement between the first surveying instrument and the autocollimation mirror of the second surveying instrument. As the offset, however, may change over time, the offset may also be determined by measurements during operation, for example during the process of alignment, including performing a first distance measurement to the autocollimation mirror 620 through the window 623 and, after rotating the telescope 600, performing a second measurement of the distance through the window 622. The offset may then be determined based on the two measurements, for example by determining half of the difference between the two measurements.

In the example of FIG. 6 the telescope is equipped with both prisms for coarse alignment of the surveying instruments as well as an autocollimation mirror for fine alignment. Alternatively, as noted above, the prisms can be provided at one of the surveying instruments, whereas the autocollimation mirror is provided at the other one of the surveying instruments.

It is now assumed that a search beam arrives from the left from a surveying instrument positioned on the left side of the telescope 600, approximately in horizontal direction substantially along the line of sight 601. During the coarse adjustment process the prism 610 above the lens 602 reflects the search beam arriving from the left in FIG. 6. If in this condition a distance between the surveying instrument emitting the search beam and the prism 610 is minimised, the surveying instrument needs to be rotated counterclockwise, thereby moving the prism 610 downwards towards the horizontal direction.

On the other and, if the search beam arrives from the right of the image plane from a surveying instrument position on the right side of the telescope 600, approximately in horizontal direction substantially along the line of sight 601, minimising the distance between the surveying instrument emitting the search beam And the prism 610 requires a counterclockwise rotation of the telescope 600 around the horizontal axis 604, thereby moving the prism 610 in upward direction in the image plane.

These distinguishable movements of the prisms allow an identification of the prism in the coarse alignment process.

Once the prism is identified, its positional relation to the autocollimation mirror 620 can be used to rotate the surveying instrument into a position in which the normal 621 of the autocollimation mirror 620 is along the line of sight of the surveying instrument carrying the autocollimator. Subsequent to this coarse alignment an adjustment of the normal of the autocollimation mirror the fine alignment of the surveying instruments can be started using the autocollimation process as detailed above.

Subsequently, a further embodiment of the invention will be described with respect to FIG. 7. The embodiment of FIG. 7 illustrates operations of a method for performing an alignment of surveying instruments in a common coordinate system.

Figure 7:
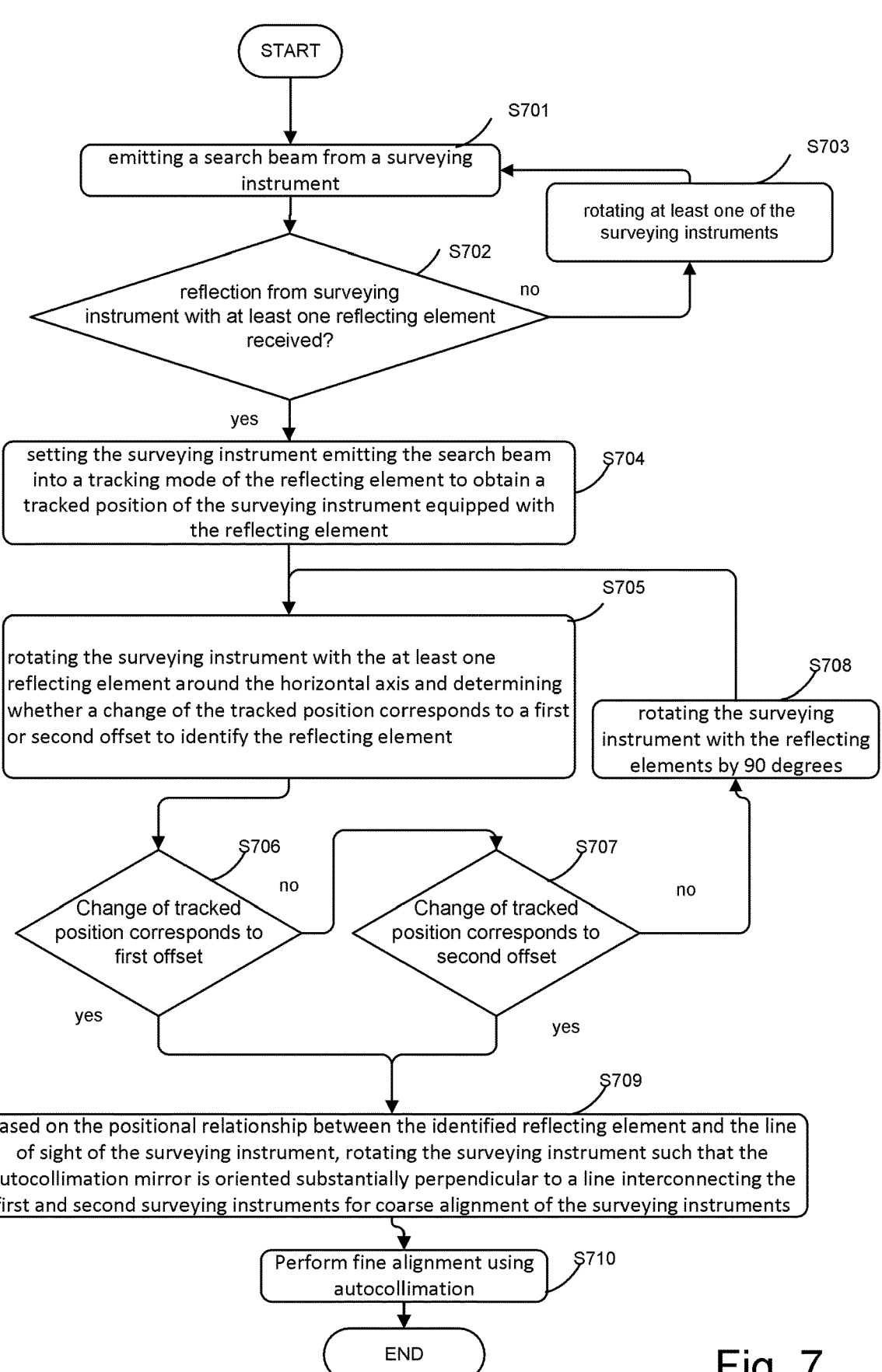
FIG. 7 illustrates operations of a method for coarsely aligning surveying elements according to an embodiment of the invention.

FIG. 7 particularly illustrates an initial coarse alignment using prisms and/or reflecting mirrors and a fine alignment using the autocollimation of a collimated beam. The operations of FIG. 7 may be performed with a surveying instrument equipped with reflecting elements as shown with respect to FIGS. 5 and 6.

In a first operation S701 a search beam from one of a pair of surveying instruments is emitted towards the other of the surveying instruments, for example as outlined above. The emitting surveying instrument may be one of the first and second surveying instruments outlined with respect to previous embodiments.

The surveying instrument equipped with the reflecting elements then is constituted by the other one of the first and second surveying instruments. It is thus possible that for the coarse alignment the first surveying instrument emits the search beam as well as the collimated light beam, or that the second surveying instrument emits the search beam and the first surveying instrument emits the collimated light beam.

In an operation S702 it is determined whether a reflection from the other surveying instrument is received at the surveying instrument emitting the light beam. The detection may be as described with respect to previous embodiments, for example using the functionality of a search and track mode of the surveying instrument. If in operation S702 the decision is "no", in an operation S703 at least one of the surveying instruments is rotated, for example in incremental steps. For example, the surveying instrument that is equipped with the reflecting element is rotated so that at least one of the reflecting elements generates a reflection back to the surveying instrument emitting the search beam. Alternatively, or in addition thereto, the surveying instrument emitting the search beam may also be rotated so as to direct the search beam towards the surveying instrument with the reflecting elements. The rotation may be around the vertical and/or horizontal axis of the respective surveying instrument, as outlined before, for example stepwise with increments smaller than the angular distances between the reflecting elements in circumferential direction. The operations S701-703 are repeated until a reflection of the surveying instrument with the reflecting elements is received at the surveying instrument emitting the search beam.

If an operation S702 the decision eventually is "yes", meaning that a reflection is received, the surveying instrument emitting the search beam is set into a tracking mode to track the reflecting element and to thus obtain a tracked position of the surveying instrument equipped with the reflecting elements. For example, in the tracking mode the surveying instrument emitting the search beam performs movements to follow the reflecting element, for example by maintaining the reflecting element on the line of sight of the telescope of the surveying instrument emitting the search beam.

In an operation S705 the surveying instrument with the at least one reflecting element is rotated around the horizontal axis and it is determined whether a change of the reflector position corresponds to a first or second angular offset to identify the reflecting element as one of the reflecting elements for example shown in FIGS. 5 and 6. The angular offsets can be distinguished from one another by first minimising the distance between the surveying instrument emitting the search beam and the reflecting element, using an electronic distance measurement, and subsequently rotating the surveying instrument with the reflector into a substantially horizontal position. Assuming that the search beam arrives from an approximately horizontal position this procedure will lead to a movement of the track position of the reflecting element in upward or downward direction, depending on the angular offset. If the reflecting element is offset above the line of sight of the surveying instrument, the movement of the track position will be upward, if the reflecting element is positioned below the line of sight of the surveying instrument, this procedure will lead to a downward movement of the track position of the reflecting element.

In an operation S706 it is determined whether a change of the track position corresponds to the first angular offset, for example using the above procedure. If the decision is "no" in operation S706, in an operation S707 it is determined whether the change of the track position corresponds to the second angular offset, as described above. The first angular offset may for example correspond to an offset above the line of sight of the reflecting element, the second angular offset may correspond to an offset below the line of sight of the reflecting element. If the decision in operation S707 is "no", it is thus determined that the reflecting element is a reflecting element positioned on the horizontal axis of the surveying instrument. In this case, in an operation S708 the surveying instrument with the reflecting elements is rotated by 90° around the vertical axis and the procedure of operations S705-S707 is repeated.

In other embodiments with other numbers of reflecting elements or types of reflecting elements other angles of rotation may be used.

After thus identifying the angular offset and thus the reflecting element generating the reflection, i.e., if in operations S706 or S707 the decision as "yes", in an operation S709 the surveying instrument with the reflecting element is rotated based on the positional relationship between the identified reflecting element and the line of sight of the surveying instrument with the reflecting element, such that the autocollimation mirror is oriented substantially perpendicular to a line interconnecting the first and second surveying instruments. This completes the coarse alignment of the surveying instrument.

Subsequent thereto, in an operation S710 a fine alignment of the surveying instruments is performed using the autocollimation process, such as outlined with respect to the previous embodiments.

The embodiment of FIG. 7 advantageously allows a swift alignment of the surveying instruments in a common coordinate system. A coarse alignment using the reflecting elements on one of the surveying instruments can be performed at high speed, and subsequently, the autocollimation process can be performed from a suitable starting position in coarse alignment of the surveying instruments.

The invention claimed is:

1. A method for aligning a first surveying instrument and a second surveying instrument, comprising:

emitting a collimated light beam from the first surveying instrument towards the second surveying instrument, the collimated light beam being aligned with a line of sight of the first surveying instrument;

receiving at the first surveying instrument a reflection of the collimated light beam from an autocollimation mirror at the second surveying instrument, a normal of the autocollimation mirror (i) being arranged with a predetermined relationship with respect to the line of sight of the second surveying instrument, and (ii) intersecting an intersection of rotational axes of the second surveying instrument;

moving at least one of the first and second surveying instruments to auto collimate the reflection of the collimated light beam at an autocollimator of the first surveying instrument; and registering the first and the second surveying instruments in a common space based on an orientation of the line of sight of the first surveying instrument and the predetermined relationship between the normal of the autocollimation mirror and the line of sight of the second surveying instrument when the collimated light beam is autocollimated at the first surveying instrument.

2. The method according to claim 1, further including emitting an adjustment instruction from a control unit for moving at least one of the first and second surveying instruments.

3. The method according to claim 1, wherein the moving includes rotating the at least one of the first and second surveying instruments around at least one of its vertical and horizontal axes.

4. The method according to claim 3, wherein the rotating of the first surveying instrument around at least one of its vertical and horizontal axes is performed in a searching and tracking mode of the first surveying instrument for searching and tracking the second surveying instrument.

5. The method according to claim 1, further including rotating the first surveying instrument to direct the collimated light beam towards the autocollimation mirror of the second surveying instrument.

6. The method according to claim 1, further including performing a coarse alignment of at least one of the first and second surveying instrument by emitting a search beam for coarse search from one of the first and second surveying instruments;

detecting whether a reflection of the search beam from one of a plurality of reflecting elements arranged with a predetermined relationship with respect to the line of sight of the other of the first and second surveying instruments is received; and if the reflection of the search beam is not received, rotating at least one of the first and second surveying instruments and repeating the search beam emission and detection operations.

7. The method according to claim 6, further including emitting an EDM laser beam from the one of the first and second surveying instruments;

wherein, if a reflection of the EDM laser beam is received from one of the plurality of reflecting elements arranged in the predetermined relationship with respect to the line of sight of the other of the first and second surveying instruments, measuring a distance to the reflecting element; and rotating the other of the first and second surveying instruments in at least one of a vertical and horizontal direction until a distance measured by the EDM laser beam is minimum.

8. The method according to claim 6, wherein the plurality of reflecting elements are arranged in circumferential direction of the other of the first and second surveying instruments such that for each orientation of the other of the first and second surveying instruments, one of the plurality of reflecting elements reflects the search beam.

9. The method according to claim 6, wherein two reflecting elements are arranged along a horizontal axis on either side of a base of the other of the first and second surveying instruments and wherein another two of the plurality of reflecting elements are arranged on either end of a telescope of the other of the first and second surveying instruments with a first and second angular offset from the line of sight of the other of the first and second surveying instruments.

10. The method according to claim 9, wherein when a reflection of the search beam is received, setting the one of the first and second surveying instruments into a tracking mode of the reflecting element to obtain a tracked position of the other of the first and second surveying instruments; and rotating the other of the first and second surveying instruments around a trunnion axis and determining whether a change of the tracked position corresponds to the first or second angular offset to identify the reflecting element and the corresponding predetermined relationship.

11. The method according to claim 10, wherein if the change does not correspond to either of the first or second angular offset, rotating the other of the first and second surveying instruments by 90 degrees and repeating the rotating around the trunnion axis to determining whether a change of the tracked position corresponds to the first or second angular offset to identify the reflecting element and the corresponding predetermined relationship.

12. The method according to claim 10, further including rotating the other of the first and second surveying instruments based on the predetermined relationship between the reflecting element and the line of sight of the other of the first and second surveying instruments such that the autocollimation mirror is oriented substantially perpendicular to a line interconnecting the first and second surveying instruments prior to performing the autocollimation.

13. The method according to claim 1, wherein the collimated light beam includes infrared light.

14. A surveying system comprising a first surveying instrument and a second surveying instrument, the surveying system configured to carry out the method of claim 1.

* * * * *